United States Patent
Parambathkandi Kunhumohammed

(10) Patent No.: US 12,376,576 B2
(45) Date of Patent: Aug. 5, 2025

(54) AUTOMATED MOSQUITO HOST BIO-MIMICKING DEVICE

(71) Applicant: Faisal Parambathkandi Kunhumohammed, Bangalore (IN)

(72) Inventor: Faisal Parambathkandi Kunhumohammed, Bangalore (IN)

(73) Assignee: Neofysis Biotech Private Limited., Karnataka (IN)

( * ) Notice: Subject to any disclaimer, the term of this patent is extended or adjusted under 35 U.S.C. 154(b) by 0 days.

(21) Appl. No.: 18/016,345

(22) PCT Filed: Jul. 15, 2021

(86) PCT No.: PCT/IN2021/050681
§ 371 (c)(1),
(2) Date: Jan. 15, 2023

(87) PCT Pub. No.: WO2022/013889
PCT Pub. Date: Jan. 20, 2022

(65) Prior Publication Data
US 2023/0270096 A1    Aug. 31, 2023

(30) Foreign Application Priority Data
Jul. 15, 2020 (IN) .............................. 202041030054

(51) Int. Cl.
*A01M 1/02* (2006.01)
*A01M 1/08* (2006.01)
*A01M 1/10* (2006.01)

(52) U.S. Cl.
CPC .............. *A01M 1/023* (2013.01); *A01M 1/08* (2013.01); *A01M 1/10* (2013.01); *A01M 2200/012* (2013.01)

(58) Field of Classification Search
CPC ............ A01M 1/08; A01M 1/04; A01M 1/10; A01M 1/023
See application file for complete search history.

(56) References Cited

U.S. PATENT DOCUMENTS 5,417,009 A * 5/1995 Butler .................... A01N 43/16
                                                      43/113
5,425,197 A * 6/1995 Smith ...................... A01M 1/14
                                                      43/113

(Continued)

FOREIGN PATENT DOCUMENTS

| CN | 111280145 A | 6/2020 |
| KR | 20090009373 A | 1/2009 |
| WO | 2019243734 A1 | 12/2019 |

OTHER PUBLICATIONS

International Search Report.
International Written Opinion.

*Primary Examiner* — Peter M Poon
*Assistant Examiner* — Marisa V Conlon
(74) *Attorney, Agent, or Firm* — Rivka Friedman

(57) ABSTRACT

The present invention discloses an automated mosquito host bio-mimicking device. The device is capable of being operated in multiple modes. The device includes a pheromone chamber (1) to enclose the mosquito attractants such as pheromones, a thermal chamber (2) to mimic the body temperature and facilitate the dissemination of the pheromones, an electronic chamber (3) for automatically regulating the functioning of the device, a photocatalysis chamber (4) to generate micro quantity of $CO_2$, a suction chamber (4a) to suck the mosquitoes reaching the mouth of the photocatalysis chamber (4), and a dehydration chamber (5) to immobilize the trapped mosquitoes. The device traps various species of mosquitoes using a broad spectrum of attractants and controls their population by providing an (Continued)

eco-friendly and cost-effective approach. Further, the device is portable and is operable remotely through a mobile application.

11 Claims, 3 Drawing Sheets

(56) References Cited

U.S. PATENT DOCUMENTS

| | | | | |
|---|---|---|---|---|
| 5,669,176 | A * | 9/1997 | Miller | A01M 1/023 |
| | | | | 43/132.1 |
| 5,813,166 | A * | 9/1998 | Wigton | A01M 1/06 |
| | | | | 43/107 |
| 6,898,896 | B1 * | 5/2005 | McBride | A01M 1/08 |
| | | | | 43/107 |
| 7,363,745 | B2 * | 4/2008 | Hsin-Chang | A01M 1/02 |
| | | | | 43/139 |
| 10,271,535 | B2 * | 4/2019 | Lillamand | A01M 1/023 |
| 11,116,198 | B2 * | 9/2021 | Hauptmann | A01M 1/06 |

* cited by examiner

AUTOMATED MOSQUITO HOST BIO-MIMICKING DEVICE

FIELD OF INVENTION

The invention generally relates to the field of insect control. More specifically, embodiments of the invention relate to a device for controlling disease-carrying mosquitoes.

BACKGROUND

Mosquitoes have been a health hazard for humans and animals alike. Mosquitoes act as a vector for pathogens and cause many deadly diseases in humans including but not limited to malaria, filaria, dengue, yellow fever, West Nile virus, and Zika virus. Hence, there is a need to control mosquitoes from obtaining access to enter closed premises.

One such technique adopted to control mosquitoes is the use of mosquito traps. Examples of commonly employed mosquito traps are based on Ultra Violet (UV) light or visible light. However, the disadvantage of the UV light-based mosquito trapping device is that the technique relies on phototaxis, i.e., navigation under the influence of light. However, a female mosquito while seeking their blood meal looks for other attractants found in their potential host other than the UV light. Examples of attractants for female mosquitoes include but are not limited to the body odor of the host, humidity of the host body, the breathing patterns of the host including the release of volatile compounds, and the host body temperature.

Another technique adopted for the control of mosquitoes is the use of an insecticide. Spraying or vaporization of insecticides in the areas infested with mosquitoes enables immediate suppression of the mosquito populations. Disadvantages of insecticide usage include but are not limited to the development of insecticide resistance, killing of non-target organisms, and endangerment to human health through continuous exposure. Additionally, most of the insecticides found in the market are toxic and only repels the mosquitoes away.

Yet another technique adopted is a biological control method. The biological control method utilizes attractants to lure the mosquito to the kill source. Further, the technique is a target-specific approach because the semiochemicals (includes pheromones and allelochemicals) are species-specific. Humans and other vertebrates secrete certain semiochemicals through their sweat, saliva, breath and urine. Mosquitoes are attracted to the scent of these chemicals in both humans and animals alike. Pheromone and/or allelomone traps are very sensitive and capable of attracting insects even at very low densities. The pheromone traps known to exist in the art include synthetic pheromone based liquid to mimic the human odour. The pheromones attract mosquitoes and direct them to a low-speed suction fan, and the dead mosquitoes collected in the trap can be cleaned.

The mosquitoes search for potential hosts for feed or ovipositioning such as the blood meal, or the nectar meal, or suitable oviposition sites, they also rely on sensory cues such as, olfactory cues, thermal cues, visual cues, and tactile cues. Hence, there is a need for a technique to address a broad spectrum of species of mosquitoes using a broad-spectrum of attracting methods.

SUMMARY OF THE INVENTION

The present invention overcomes the drawback of the prior arts by providing a portable, eco-friendly, and cost-effective approach to control the population of mosquitoes using organic compound or non-toxic food grade compounds as pheromones and a broad spectrum of attracting methods to address a broad spectrum of species of mosquitoes.

According to an embodiment of the invention, the device comprises a pheromone chamber situated at the topmost portion of the device for holding pheromones, a thermal chamber situated below the pheromone chamber for heating the pheromones and to mimic the body temperature of the host, an electronic chamber coupled with the thermal chamber to regulate the functioning of the device, a photocatalysis chamber comprising a UV-A spectrum light and a photocatalysis disc to generate micro quantity of $CO_2$, a suction chamber encircled below the photocatalysis chamber comprising a suction fan enclosed with a protective mesh and is coupled to a power socket, and a dehydration chamber comprising a collection bowl with a perforated wall and coupled to the suction fan to suck the mosquitoes reaching the opening of the photocatalysis chamber and immobilizes the mosquitoes through dehydration.

Thus, the device is capable of trapping mosquitoes, thereby enabling the control of the mosquito population. The device is portable and capable of being operated remotely, hence suitable for various premises.

DETAILED DESCRIPTION OF THE INVENTION

The definitions, terms, and terminology adopted in the disclosure have their usual meaning and interpretations, unless otherwise specified. Various embodiments of the invention provide an automatic mosquito host bio-mimicking device that is eco-friendly and portable for controlling the mosquito population. The present invention provides the device capable of being operated in multiple modes and configured to simultaneously generate multiple attractants to mimic various hosts of mosquitoes. The definition of a mosquito host means that the device is potent to bio-mimic as a blood meal host, a floral nectar host, or an ovipositioning host for mosquitoes.

The term multiple mosquito host bio-mimicking attractants refers to odourants such as body temperature or humidity of the blood meal host including human or vertebrate, floral nectar odourant of the feeding host, or odourants mimicking ovipositioning site for mosquitoes. The term multiple sensory cues refers to olfactory cues, thermal cues, visual cues, and tactile cues generated by the device.

Figure 1:
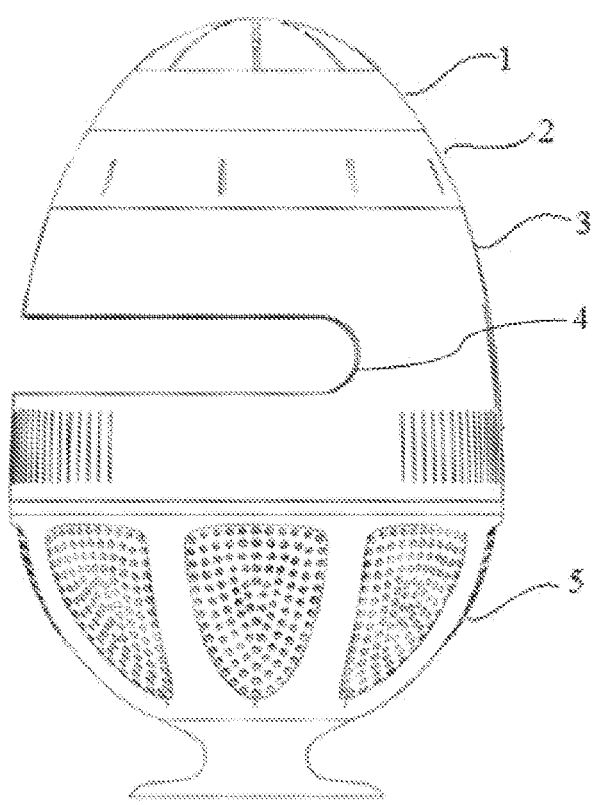
FIG. 1 shows a mosquito host bio-mimicking device, according to an embodiment of the invention.

FIG. 1 shows a mosquito host bio-mimicking device, according to an embodiment of the invention. The device comprises a pheromone chamber (1), a thermal chamber (2), an electronic chamber (3), a photocatalysis chamber (4), and a dehydration chamber (5).

Figure 2:
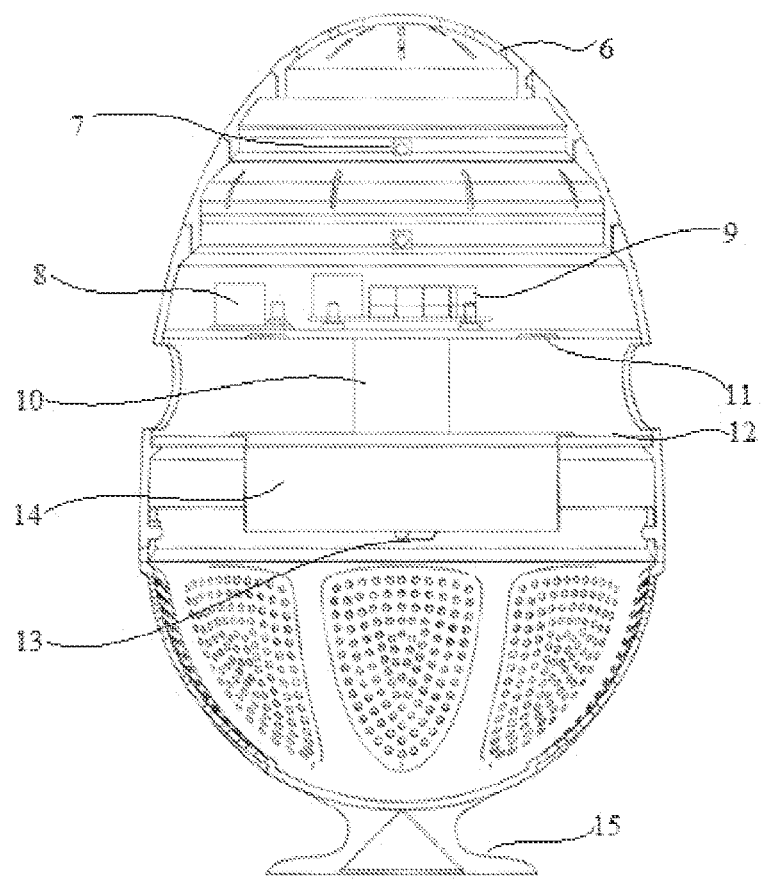
FIG. 2 shows a cross-sectional view of the mosquito host bio-mimicking device, according to an embodiment of the invention.
Figure 2A:
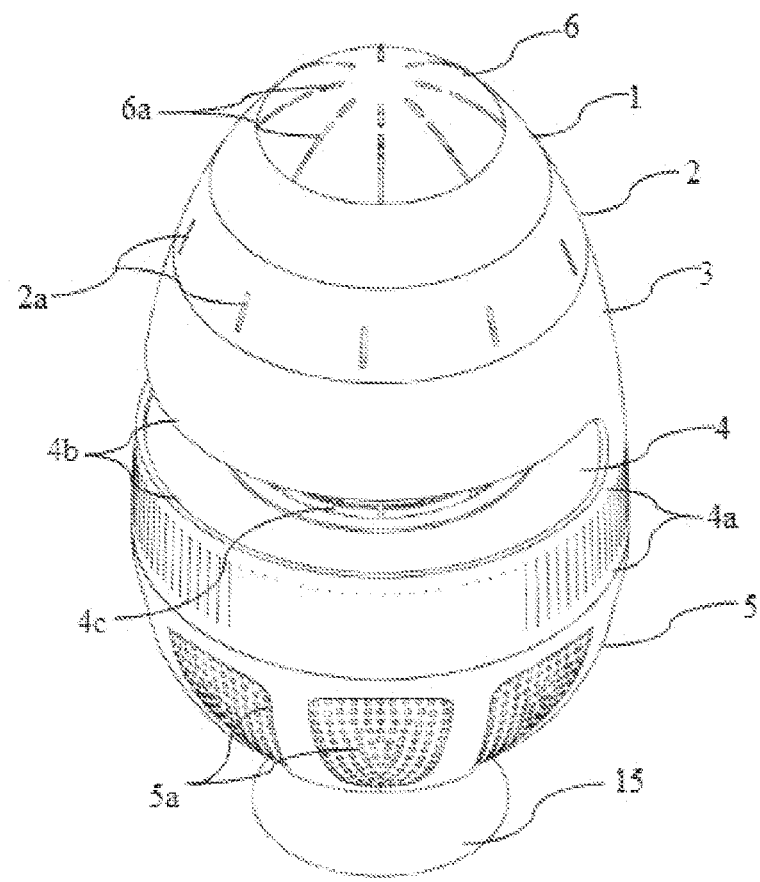
FIG. 2a shows a perspective view of the mosquito host bio-mimicking device, according to an embodiment of the invention.

FIG. 2 shows a cross sectional-view of the mosquito host bio-mimicking device, according to an embodiment of the invention. FIG. 2a shows a perspective view of the mosquito host bio-mimicking device, according to an embodiment of the invention. The pheromone chamber (1) located at the top-most portion of the device encloses the mosquito attracting pheromones in the form of a pheromone hydrogel sachet, hydrogel beads, or liquid pheromones. The pheromones are contained within the pheromone chamber (1) to attract the mosquitoes. The pheromone chamber (1) is provided with a pheromone loading cap (6) to load the pheromone hydrogel into the pheromone chamber (1). The pheromones and moisture contained in the hydrogel disseminates into the outside vicinity through one or more minute perforations (6a) provided on the pheromone loading cap (6). The pheromone loading cap (6) has a manual detachable locking and unlocking means to close the pheromone chamber (1). The hydrogel described herein shall be described in detail below.

In one embodiment of the invention, the pheromone is in a globule form, for example, a water gel. The pheromones and water are locked into a functional polymer. Both the hydrogel bead and the hydrogel sachet are effective for a duration of up to 8 hours and replaced accordingly. The sachet used for packaging the hydrogel is biodegradable and made of eco-friendly natural substances.

The hydrogel essentially contains organic compounds or non-toxic food-grade compounds selected from a list comprising but not limited to lactic acid, alpha-pinene, methanol, benzoyl acetate, methyl benzoate, linalool, lilac aldehyde, octanal, hexenal, hexanoic acid, p-cresol, citronellal, geraniol, geranyl acetate, benzaldehyde, nonanal, octenol, ethyl alcohol, purified solvent water or a combination thereof. The organic compound or the non-toxic food-grade compound is combined with water, and a hydrophilic substance to form a gel. Examples of hydrophilic substance employed include but is not limited to sodium polyacrylate and potassium polyacrylate.

According to an embodiment of the invention, organic compounds and food-grade compounds such as semiochemicals attractive to mosquitoes commonly found in humans, vertebrates and plants are dissolved in water to form a solution that mimics human body odour, animal body odour, or floral nectar and also attractants mimicking as ovipositioning host. The resulting solution is dipped in sodium polyacrylate or potassium polyacrylate beads or powder to obtain the hydrogel.

The semiochemicals comprises pheromones, kairomones or allomones.

In one embodiment of the invention, the pheromone chamber (1) holds pheromones in the form of liquid which can be dispersed as cold mist through an additional component such as an ultrasonic humidifier or a mist maker.

In one embodiment of the invention, the device intends to bio-mimic as a potential host, such as humans or other vertebrates or floral nectar meal or ovipositioning host for mosquitoes.

According to an embodiment of the invention, the pheromone attractants are species-specific. In one example, the pheromone attractant is specific to *Anopheles* mosquitoes. In another example, the pheromone attractant is specific to *Aedes* mosquitoes.

The thermal chamber (2) placed below the pheromone chamber (1) includes a positive temperature coefficient heater (not shown), hereinafter referred to as the PTC heater. The PTC heater mimics the body temperature of humans or other vertebrates, and the chamber is provided with a plurality of perforations (2a) for dissipation of heat. The PTC heater is located below the pheromone chamber (1) and heat the pheromone hydrogel. The thermal chamber (2) further includes a micro-fan (7) configured to enable uniform dissemination of pheromones into the vicinity. The micro-fan (7) pushes warm air from the PTC heater onto the pheromone hydrogel. The warm air causes the slow evaporation of the pheromone hydrogel, causing the release of humidity and pheromone volatiles into the outside vicinity.

The electronic chamber (3) placed below the thermal chamber (2) includes an internet of things controller, hereinafter referred to as the IoT controller (8), a digital heater controller (9), and a power supply conduit spine (10).

In one embodiment, the mosquito host bio-mimicking device uses the peak mosquito activity times as an attractant. Mosquito activity increases during sunrise, sunset and moonlight. Further, the device is configured to operate during dawn and dusk.

Additionally, the device is configured to operate during various phases of the moon. The device uses IoT technology to latch onto the online weather data. The device is operable through a Wi-Fi controller to control the entire device, including the digital heater controller (9), the micro-fan (7), and the overall power supply conduit spine (10) in a timely manner through a cloud broker programmable through a mobile application. The device automatically switches on and enables the dissemination of the pheromones during the peak mosquito activity times.

The photocatalysis chamber (4) situated below the electronic chamber (3) includes a UV-A spectrum light (11) and a photocatalysis disc (12). The photocatalysis disc (12) is a plate coated with nano Titanium Dioxide ($TiO_2$) in sol-gel form. The photocatalysis method uses UV light and nano $TiO_2$ to generate a small quantity of $CO_2$. The coating with nano $TiO_2$ improves the efficiency of photocatalysis compared to coating the surface with regular $TiO_2$ powder. The photocatalysis chamber (4) forms an outer circular chamber above a suction chamber (4a) and has an opening (4b) for trapping the mosquitoes reaching the mouth of the photocatalysis chamber (4) by means of the suction fan (14) enclosed under a protective mesh (4c) situated within the suction chamber (4a).

The suction chamber (4a) is configured to include a power socket (13) to plug the device to a power source through a detachable cord or cable.

The dehydration chamber (5) is the bottom-most portion of the device and comprises a collection bowl with a perforated wall (Sa). The air sucked from the suction chamber (4a) is pushed out through the perforated wall (5a). The mosquitoes are trapped in the dehydration chamber (5) and immobilized due to broken limbs and wings, and die after a few hours due to dehydration. Further, the dehydration chamber (5) is removably engaged with the suction chamber (4a) and the lower end of the dehydration chamber (5) is provided with a base (15) for mounting the device.

The mosquito attractants disclosed herein attracts and traps mosquitoes effectively and efficiently. The device is portable, eco-friendly, and provides a cost-effective means compared to the existing traps. The device works on Direct Current (DC) and hence works directly with a 12V battery or on Alternating Current (AC) using an AC to DC power adapter.

In one example, the device is programmed according to the peak mosquito activity, as the mosquitoes are definitive in their feeding behavior. Females of the Anopheline species prefer predawn and dusk time for feeding, while the *Culex* species prefer the post dusk to early night for feeding. However, in the case of *Aedes* species, the females bite and feeds on the host blood throughout the day and there is no specific feeding time. Hence, considering the above factors, the device makes use of the IoT technology for automatically dispensing varied amount of mosquito attractants such as humidity, body temperature, and semiochemicals based on the time of the day or diurnal changes as per the pre-set program in order to maximize the capture of the targeted species at the particular time.

The invention further discloses a process of attracting the mosquitoes using the automated mosquito host bio-mimicking device. The process comprises generating a signal for automatic switching on or switching off of the device based on the peak activity of the mosquitoes. The mosquitoes are lured towards the device by disseminating multiple attractants generated by the pheromone chamber (1), the thermal chamber (2) and the photocatalysis chamber (4), followed by sucking the mosquitoes reaching the opening (4b) of the photocatalysis chamber (4) into the dehydration chamber (5) due to downward air pressure generated by the suction fan (14), finally trap the mosquitoes in the dehydration chamber (5), and subsequently, dehydrate and immobilize the mosquitoes due to broken wings and limbs.

A comprehensive approach that encompasses flight, host identification, mating and oviposition, and diurnal changes is essential for the effective control of the mosquito species. The device makes use of pheromones, attractants used by mosquitoes for their reproduction and survival. The present study determines the efficacy of the device in trapping mosquitoes, which mimics the host identifying components and other homing factors of mosquitoes towards the host and oviposition that are essential for its survival. The device is tested in urban areas consisting of independent residential surroundings and apartment complexes, and suburban areas consisting of temporary buildings like sheet houses, sheds, and shanties.

In another example, a study was carried out throughout the year by categorizing into seasons such as monsoon (June-August), post-monsoon (September-November), winter (December-February), and summer (March-May). The daily changes in the catch are recorded in a 12 hour cycle or a 24 hour cycle. The activity is recorded at dawn between 5.00 am-6.45 am, forenoon between 6.45 am-12.00 pm, afternoon between 12.00 pm-5.45 pm, dusk between 5.45 pm-6.45 pm, evening between 6.45 pm-8.30 pm and overnight between 8.30 pm-5.00 am. Each catch is scored for the species type, number of the mosquitoes. The peak trap averages for the mosquito species such as *Anopheles stephensi*, *Culex quinquefasciatus*, *Aedes aegypti* are tabulated.

Table 1a: Tabulates the peak activity time of different species of mosquitoes and the average mosquito trap data collected from residential surroundings in an urban area during the monsoon.

TABLE 1a

| Sl. No. | Time | *An. stephensi* | *Cx. quinquefasciatus* | *Ae. aegypti* | Total |
|---|---|---|---|---|---|
| 1. | Dawn | 06 | 12 | 06 | 24 |
| 2. | Forenoon | 01 | 05 | 14 | 20 |
| 3. | Afternoon | 02 | 08 | 15 | 25 |
| 4. | Dusk | 04 | 10 | 18 | 32 |
| 5. | Evening | 04 | 15 | 16 | 35 |
| 6. | Overnight | 06 | 25 | 07 | 38 |
|  |  | 23 | 75 | 76 | 174 |

Table 1b: Tabulates the peak activity time of different species of mosquitoes and the average mosquito trap data collected from residential surroundings in an urban area during the post-monsoon.

TABLE 1b

| Sl. No. | Time | *An. stephensi* | *Cx. quinquefasciatus* | *Ae. aegypti* | Total |
|---|---|---|---|---|---|
| 1. | Dawn | 04 | 15 | 08 | 27 |
| 2. | Forenoon | 00 | 08 | 18 | 26 |
| 3. | Afternoon | 01 | 12 | 20 | 33 |
| 4. | Dusk | 05 | 15 | 15 | 35 |
| 5. | Evening | 03 | 20 | 20 | 43 |
| 6. | Overnight | 04 | 23 | 10 | 37 |
|  |  | 17 | 93 | 91 | 201 |

Table 1c: Tabulates the peak activity time of different species of mosquitoes and the average mosquito trap data collected from residential surroundings in an urban area during the winter.

TABLE 1c

| Sl. No. | Time | *An. stephensi* | *Cx. quinquefasciatus* | *Ae. aegypti* | Total |
|---|---|---|---|---|---|
| 1. | Dawn | 01 | 12 | 09 | 22 |
| 2. | Forenoon | 01 | 05 | 15 | 17 |
| 3. | Afternoon | 00 | 05 | 17 | 22 |
| 4. | Dusk | 03 | 16 | 12 | 31 |
| 5. | Evening | 01 | 14 | 17 | 32 |
| 6. | Overnight | 02 | 10 | 12 | 24 |
|  |  | 08 | 58 | 82 | 148 |

Table 1 d: Tabulates the peak activity time of different species of mosquitoes and the average mosquito trap data collected from residential surroundings in an urban area during the summer.

TABLE 1d

| Sl. No. | Time | *An. Stephensi* | *Cx. quinquefasciatus* | *Ae. aegypti* | Total |
|---|---|---|---|---|---|
| 1. | Dawn | 01 | 10 | 14 | 25 |
| 2. | Forenoon | 00 | 04 | 16 | 20 |
| 3. | Afternoon | 00 | 02 | 14 | 16 |
| 4. | Dusk | 04 | 20 | 10 | 34 |
| 5. | Evening | 01 | 18 | 23 | 42 |
| 6. | Overnight | 01 | 14 | 15 | 30 |
|  |  | 07 | 68 | 92 | 167 |

Table 2a: Tabulates the peak activity time of different species of mosquitoes and the average mosquito trap data collected from the apartment complexes in an urban area during the monsoon.

TABLE 2a

| Sl. No. | Time | *An. stephensi* | *Cx. quinquefasciatus* | *Ae. aegypti* | Total |
|---|---|---|---|---|---|
| 1. | Dawn | 04 | 10 | 04 | 18 |
| 2. | Forenoon | 00 | 04 | 19 | 23 |
| 3. | Afternoon | 00 | 03 | 15 | 18 |
| 4. | Dusk | 03 | 08 | 13 | 24 |
| 5. | Evening | 03 | 20 | 20 | 43 |
| 6. | Overnight | 01 | 20 | 15 | 36 |
|  |  | 11 | 65 | 86 | 162 |

Table 2b: Tabulates the peak activity time of different species of mosquitoes and the average mosquito trap data collected from the apartment complexes in an urban area during the post-monsoon.

TABLE 2b

| SI. No. | Time | An. stephensi | Cx. quinquefasciatus | Ae. aegypti | Total |
|---|---|---|---|---|---|
| 1. | Dawn | 02 | 09 | 04 | 15 |
| 2. | Forenoon | 01 | 04 | 10 | 15 |
| 3. | Afternoon | 00 | 06 | 15 | 31 |
| 4. | Dusk | 04 | 14 | 13 | 31 |
| 5. | Evening | 01 | 18 | 14 | 33 |
| 6. | Overnight | 02 | 15 | 08 | 25 |
|  |  | 10 | 66 | 64 | 140 |

Table 2c: Tabulates the peak activity time of different species of mosquitoes and the average mosquito trap data collected from the apartment complexes in an urban area during the winter.

TABLE 2c

| SI. No. | Time | An. stephensi | Cx. quinquefasciatus | Ae. aegypti | Total |
|---|---|---|---|---|---|
| 1. | Dawn | 00 | 06 | 04 | 15 |
| 2. | Forenoon | 00 | 00 | 04 | 04 |
| 3. | Afternoon | 00 | 01 | 10 | 11 |
| 4. | Dusk | 02 | 10 | 13 | 25 |
| 5. | Evening | 02 | 05 | 14 | 21 |
| 6. | Overnight | 01 | 12 | 10 | 23 |
|  |  | 05 | 34 | 53 | 92 |

Table 2d: Tabulates the peak activity time of different species of mosquitoes and the average mosquito trap data collected from the apartment complexes in an urban area during the summer.

TABLE 2d

| SI. No. | Time | An. Stephensi | Cx. quinquefasciatus | Ae. aegypti | Total |
|---|---|---|---|---|---|
| 1. | Dawn | 00 | 05 | 06 | 11 |
| 2. | Forenoon | 00 | 02 | 04 | 06 |
| 3. | Afternoon | 00 | 00 | 04 | 04 |
| 4. | Dusk | 01 | 15 | 12 | 28 |
| 5. | Evening | 02 | 19 | 14 | 35 |
| 6. | Overnight | 00 | 12 | 08 | 20 |
|  |  | 03 | 53 | 48 | 104 |

Table 3a: Tabulates the peak activity time of different species of mosquitoes and the average mosquito trap data collected from a residential suburban area during the monsoon.

TABLE 3a

| SI No. | Time | An. stephensi | Cx. quinquefasciatus | Ae. aegypti | Total |
|---|---|---|---|---|---|
| 1. | Dawn | 02 | 08 | 05 | 15 |
| 2. | Forenoon | 00 | 05 | 20 | 25 |
| 3. | Afternoon | 00 | 02 | 18 | 20 |
| 4. | Dusk | 04 | 10 | 17 | 31 |
| 5. | Evening | 04 | 25 | 25 | 54 |
| 6. | Overnight | 02 | 30 | 12 | 44 |
|  |  | 12 | 80 | 97 | 189 |

Table 3b: Tabulates the peak activity time of different species of mosquitoes and the average mosquito trap data collected from a residential suburban area during the post-monsoon.

TABLE 3b

| SI. No. | Time | An. stephensi | Cx. quinquefasciatus | Ae. aegypti | Total |
|---|---|---|---|---|---|
| 1 | Dawn | 01 | 05 | 03 | 09 |
| 2. | Forenoon | 00 | 00 | 11 | 11 |
| 3. | Afternoon | 00 | 00 | 14 | 14 |
| 4. | Dusk | 02 | 12 | 12 | 26 |
| 5. | Evening | 00 | 10 | 18 | 28 |
| 6. | Overnight | 00 | 05 | 07 | 12 |
|  |  | 03 | 32 | 65 | 100 |

Table 3c: Tabulates the peak activity time of different species of mosquitoes and the average mosquito trap data collected from a residential surrounding in a suburban area during the winter.

TABLE 3c

| SI. No. | Time | An. stephensi | Cx. quinquefasciatus | Ae. aegypti | Total |
|---|---|---|---|---|---|
| 1. | Dawn | 00 | 08 | 04 | 12 |
| 2. | Forenoon | 00 | 03 | 06 | 09 |
| 3. | Afternoon | 00 | 02 | 00 | 02 |
| 4. | Dusk | 01 | 15 | 15 | 31 |
| 5. | Evening | 05 | 06 | 19 | 30 |
| 6. | Overnight | 00 | 14 | 20 | 34 |
|  |  | 06 | 48 | 64 | 118 |

Table 3d: Tabulates the peak activity time of different species of mosquitoes and the average mosquito trap data collected from a residential suburban area during the summer.

TABLE 3d

| SI. No. | Time | An. Stephensi | Cx. quinquefasciatus | Ae. aegypti | Total |
|---|---|---|---|---|---|
| 1. | Dawn | 01 | 03 | 04 | 08 |
| 2. | Forenoon | 00 | 01 | 10 | 11 |
| 3. | Afternoon | 00 | 00 | 06 | 06 |
| 4. | Dusk | 02 | 12 | 17 | 31 |
| 5. | Evening | 01 | 25 | 19 | 45 |
| 6. | Overnight | 00 | 20 | 15 | 35 |
|  |  | 04 | 61 | 71 | 136 |

Thus, the device determines the peak time of activity of different species of the mosquitoes and effectively releases the pheromones and other host mimicking attractants for trapping the mosquitoes. The peak activity time of *Anopheles stephensi* is identified during dawn and dusk. The peak activity time of *Culex quinquefasciatus* is identified during dusk, evening, and overnight. The peak activity time of *Aedes aegypti* is found throughout the day. Hence, the robustness of the device to effectively trap the various species of mosquitoes exhibiting different peak activity times and the release of specific attractants for automatically serving the purpose intended is an added advantage.

Thus, the invention provides a portable and cost-effective mosquito host bio-mimicking device for targeting various species of mosquitoes that can operate across various time durations, calculated based on a day, lunar phases, and operated remotely by adopting IoT techniques. The device is effective against a broad spectrum of species of mosquitoes involving a broad spectrum of attracting methods. The device includes a feeding host such as blood meal or nectar meal, suitable oviposition sites, and multiple sensory cues such as olfactory cues, thermal cues, visual cues, and tactile cues, thus mimicking as the potential mosquito host.

The foregoing description of the invention has been set merely to illustrate the invention and is not intended to be limiting. Since modifications of the disclosed embodiments incorporating the spirit and substance of the invention may occur to person skilled in the art, the invention should be construed to include everything within the scope of the appended claims and equivalents thereof.

What is claimed is:

1. An automated mosquito host bio-mimicking device having a top-most portion and a bottom-most portion, the device comprising:
    a pheromone chamber (1) located at the top-most portion of the device, wherein the pheromone chamber (1) disseminates one or more semiochemical as a first bio-mimicking attractant;
    a thermal chamber (2) placed below the pheromone chamber (1), wherein the thermal chamber (2) includes a positive temperature coefficient (PTC) heater and is configured to disseminate heat as a second bio-mimicking attractant;
    a micro fan (7) placed above the PTC heater is configured for uniform dissemination of both the first bio-mimicking attractant and the second bio-mimicking attractant;
    an electronic chamber (3) placed below the thermal chamber (2), wherein the electronic chamber (3) includes an Internet of Things (IoT) controller (8) coupled to a digital heater controller (9) configured to regulate the functioning of the device;
    a photocatalysis chamber (4) situated below the electronic chamber (3), wherein the photocatalysis chamber (4) comprises a UV-A spectrum light (11) for generating a visual cue and a photocatalysis disc (12) configured to generate micro quantity of $CO_2$ as a third bio-mimicking attractant; and
    a dehydration chamber (5) including a collection bowl with a perforated wall to trap the mosquitoes, the photocatalysis disc (12) removably position over the dehydration chamber (4), and a suction fan (14) having a protective mesh (4c) mounted at a center of the photocataysis disc (12) and configured for downward air pressure, wherein the dehydration chamber (5) is detachably mounted at the bottom-most portion of the device,
wherein the device automatically dispenses the first, second, and third bio-mimicking attractants simultaneously based on a peak activity time of the mosquitoes.

2. The device as claimed in claim 1, wherein the pheromone chamber (1) comprises a pheromone loading cap (6) with a plurality of minute perforations (6a) for the dispersion of the semiochemicals.

3. The device as claimed in claim 1, wherein the one or more semiochemicals are loaded in the form of a hydrogel sachet, a hydrogel bead or in a liquid form.

4. The device as claimed in claim 3, wherein a hydrogel of each of the hydrogel sachet and the hydrogel bead comprises an aqueous solution of organic compounds or non-toxic food-grade compounds of semiochemicals dipped in sodium polyacrylate or potassium polyacrylate.

5. The device as claimed in claim 4, wherein the semiochemicals comprises pheromones, kairomones or allomones.

6. The device as claimed in claim 1, wherein the thermal chamber (2) is provided with a plurality of perforations (2a) for dissipation of heat.

7. The device as claimed in claim 1, wherein the dehydration chamber (5) traps and immobilizes the mosquitoes due to broken wings and limbs.

8. The device as claimed in claim 1, wherein the device includes a program adapted to cause the device to bio-mimic and trap the mosquitoes by:
    generating a signal for automatic switching on or switching off of the device based on the peak activity time of the mosquitoes;
    disseminating the first, second, and third bio-mimicking attractants to lure the mosquitoes towards the device generated by the pheromone chamber (1), the thermal chamber (2), and the photocatalysis chamber (3);
    sucking the mosquitoes reaching an opening (4b) of the photocatalysis chamber (4) into the dehydration chamber (5); and
    trapping and immobilizing the mosquitoes in the dehydration chamber (5).

9. The device as claimed in claim 1, wherein the dehydration chamber (5) is provided with a base (15) for mounting the device.

10. The device as claimed in claim 1, wherein the peak activity time of mosquitoes is duration specific, the duration specificity is linked to species-specificity and pre-set in the device.

11. The device as claimed in claim 1, wherein: the first bio-mimicking attractant generated from the pheromone chamber (1) is selected from a list consisting of odourants of a blood meal host, floral nectar odourants, and odourants mimicking a potential ovipositioning site for the mosquitoes, the second bio-mimicking attractant generated from the thermal chamber (2) mimics body temperature of the blood meal host, and the third bio-mimicking attractant, $CO2$ generated by the photocatalysis disc (12), mimics humidity of the blood meal host; wherein the blood meal host is a human or other vertebrate.

* * * * *